(12) United States Patent
Katase

(10) Patent No.: US 10,986,424 B2
(45) Date of Patent: Apr. 20, 2021

(54) SENSOR UNIT, AND MULTIPLE-TYPE SENSOR USING THE SAME

(71) Applicant: KOA CORPORATION, Nagano (JP)

(72) Inventor: Yasuyuki Katase, Nagano (JP)

(73) Assignee: KOA CORPORATION, Nagano (JP)

( * ) Notice: Subject to any disclaimer, the term of this patent is extended or adjusted under 35 U.S.C. 154(b) by 0 days.

(21) Appl. No.: 16/642,224

(22) PCT Filed: Aug. 29, 2018

(86) PCT No.: PCT/JP2018/031908
§ 371 (c)(1),
(2) Date: Feb. 26, 2020

(87) PCT Pub. No.: WO2019/049742
PCT Pub. Date: Mar. 14, 2019

(65) Prior Publication Data
US 2020/0267457 A1 Aug. 20, 2020

(30) Foreign Application Priority Data
Sep. 11, 2017 (JP) .............................. JP2017-173739

(51) Int. Cl.
*H04Q 9/00* (2006.01)
(52) U.S. Cl.
CPC ........... *H04Q 9/00* (2013.01); *H04Q 2209/30* (2013.01); *H04Q 2209/88* (2013.01)
(58) Field of Classification Search
CPC .. H04Q 9/00; H04Q 2209/00; H04Q 2209/10; H04Q 2209/30; H04Q 2209/80; H04Q 2209/84; H04Q 2209/88
See application file for complete search history.

(56) References Cited
U.S. PATENT DOCUMENTS 6,717,515 B1 * 4/2004 Osako .................... G08C 23/06
340/1.1
10,366,028 B2 * 7/2019 Riekstins .............. G06F 13/364
(Continued)

FOREIGN PATENT DOCUMENTS

JP   H01-289335 A   11/1989
JP   H05-308357 A   11/1993
(Continued)

OTHER PUBLICATIONS

International Search Report, dated Oct. 13, 2018, in International Application No. PCT/JP2018/031908.
(Continued)

*Primary Examiner* — Franklin D Balseca
(74) *Attorney, Agent, or Firm* — Greenblum & Bernstein, P.L.C.

(57) ABSTRACT

An object of the present invention is to provide a sensor unit that can suppress deterioration in communication quality as compared with in the conventional art even when a number of sensor units are connected in sequence, and multiple-type sensor using the sensor unit. A sensor unit in the present invention includes a sensor, and a microcontroller that is electrically connected with the sensor and processes a detection signal of the sensor, wherein the microcontroller includes a host communication control unit that communicates with a host device and a client communication control unit that communicates with a client device. According to the present invention, the deterioration in communication quality can be suppressed as compared with in the conventional art, even when a number of sensor units are connected in sequence.

4 Claims, 9 Drawing Sheets

(56) References Cited

U.S. PATENT DOCUMENTS

2014/0266792 A1* 9/2014 Raymond .............. H04Q 9/00
340/870.11
2015/0301512 A1 10/2015 Saegusa et al.

FOREIGN PATENT DOCUMENTS

| JP | H08-172681 A | 7/1996 |
| JP | 2001-222788 A | 8/2001 |
| JP | 2014-014182 A | 1/2014 |
| JP | 2015-204584 | 11/2015 |

OTHER PUBLICATIONS

Written Opinion of the International Searching Authority, dated Oct. 30, 2018, in International Application No. PCT/JP2018/031908.

* cited by examiner

SENSOR UNIT, AND MULTIPLE-TYPE SENSOR USING THE SAME

TECHNICAL FIELD

The present invention relates to a sensor unit, and a multiple-type sensor using the same.

BACKGROUND ART

Patent Literature 1 discloses a communication system in which a main unit 100 is connected with a plurality of communication modules 200 in a daisy chain form. The communication modules are bus-connected via a communication line.

CITATION LIST

Patent Literature

Patent Literature 1: Japanese Patent Laid-Open No. 2014-14182

SUMMARY OF INVENTION

Technical Problem

However, in the case of bus connection as disclosed in Patent Literature 1, a host side and a client side share the same communication line in each of the communication module serving as a sensor unit. Therefore, when a number of sensor units are connected in sequence, the communication quality deteriorates.

The present invention has been made in view of the above problem, and an object thereof is to provide a sensor unit that can suppress deterioration in communication quality as compared with in the conventional art even when a number of sensor units are connected in sequence, and multiple-type sensor using the sensor unit.

Solution to Problem

A sensor unit in the present invention includes a sensor, and a control unit that is electrically connected with the sensor and processes a detection signal of the sensor, wherein the control unit includes a host communication control unit that communicates with a host device and a client communication control unit that communicates with a client device.

In the present invention, it is preferable that the sensor unit further includes a circuit power supply generation part that generates a driving power supply of a circuit function section including the sensor and the control unit.

In the present invention, it is preferable that the sensor unit further includes a reporting part that reports detection information of the sensor.

A multiple-type sensor in the present invention in which a plurality of sensor units are connected via communication cables, the sensor unit including a sensor, and a control unit that is electrically connected with the sensor and processes a detection signal of the sensor, wherein the control unit includes a host communication control unit that communicates with a host device and a client communication control unit that communicates with a client device.

Advantageous Effects of Invention

According to the present invention, the deterioration in communication quality can be suppressed as compared with in the conventional art, even when a number of sensor units are connected in sequence.

DESCRIPTION OF EMBODIMENTS

Hereinafter, an embodiment of the present invention (hereinafter to be abbreviated as an "embodiment") will be described in detail. Note that the present invention is not limited to the following embodiment, but can be embodied in various modifications in a range of its gist.

Figure 1A:
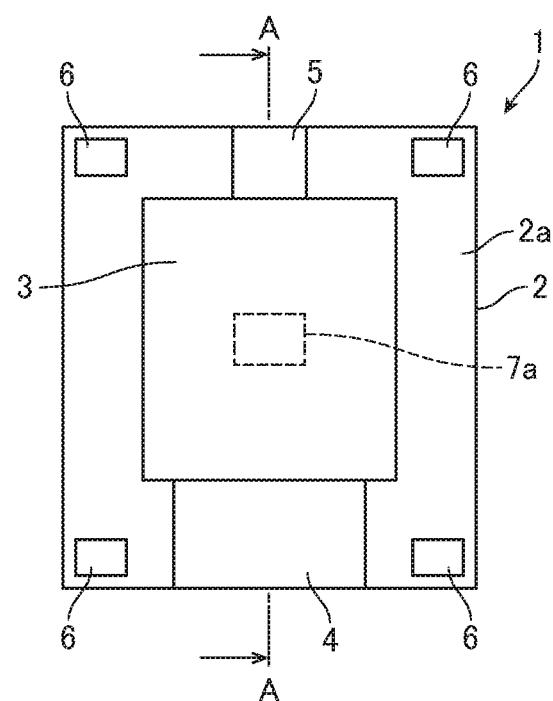
FIG. 1A is a plan view illustrating a sensor unit of the present embodiment.
Figure 1B:
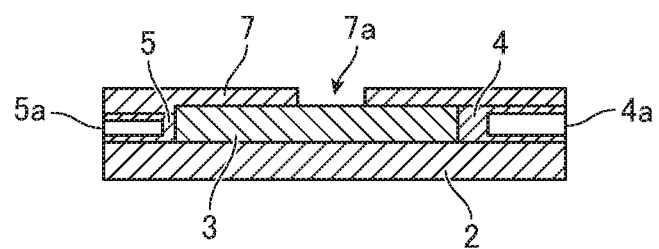
FIG. 1B is a cross-sectional view of the sensor unit taken along line A-A and viewed from the direction of the arrows in FIG. 1A.

FIG. 1A is a plan view illustrating a sensor unit of the present embodiment, and FIG. 1B is a cross-sectional view of the sensor unit taken along line A-A and viewed from the direction of the arrows in FIG. 1A.

A sensor unit 1 in the present embodiment is, for example, a flow sensor.

The sensor unit 1 includes a board 2, a sensor 3 that is arranged on a front face 2a of the board 2, external connection terminals 4 and 5 that are electrically connected to the sensor 3, and a reporting part 6 that reports the detection information of the sensor 3 to the outside.

As illustrated in FIG. 1A, the sensor 3 is arranged substantially at the center of the front face 2a of the board 2. The external connection terminals 4 and 5 are arranged at both sides of the sensor 3, respectively, on the front face 2a of the board 2. Accordingly, the sensor 3 and the external connection terminals 4 and 5 are arranged in a row on the board 2. The external connection terminals 4 and 5 illustrated in FIG. 1A and FIG. 1B have different shapes, and have openings 4a and 5a having different sizes, respectively. Each of the external connection terminals 4 and 5 illustrated in FIG. 1A and FIG. 1B is a USB terminal. For example, a USE-A type is connected to an external connection terminal 4, and a micro USE type is connected to an external connection terminal 5.

As illustrated in FIG. 1A, a plurality of reporting parts 6 are arranged at four corners of the board 2, respectively (a case 7 is not illustrated). Note that the number of reporting parts 6 is not limited, and positions of the reporting parts 6 are not limited. For example, the reporting parts 6 may be provided to overlap with one another on the front face of the sensor 3.

As illustrated in FIG. 1B, the front face of the sensor 3 is covered with the case 7. The case 7 may be transparent or non-transparent. A through hole 7a is provided in the case 7. The through hole 7a is, for example, a hole for sending wind to the sensor 3 so that the sensor 3 can detect the wind via the through hole 7a. Note that the case 7 may not be provided. Alternatively, a configuration may be adopted in which the front face of the sensor 3 is covered with a sealing resin.

Figure 2:
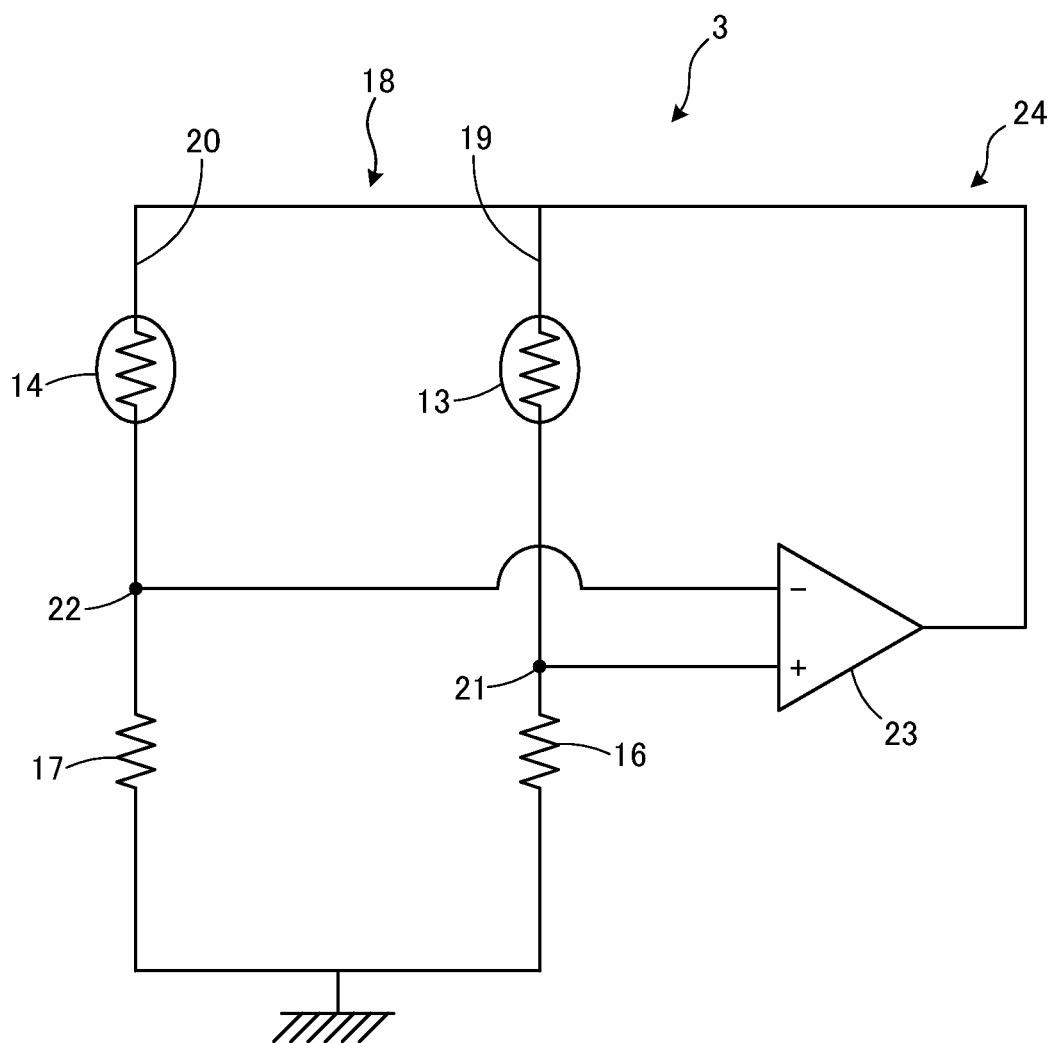
FIG. 2 is a circuit diagram of the sensor.

Next, a configuration of the sensor 3 will be described. FIG. 2 is a circuit diagram of the sensor 3. As illustrated in FIG. 2, a flow rate detection resistive element 13, a temperature compensation resistive element 14, and resistors 16 and 17 constitute a bridge circuit 18. As illustrated in FIG. 2, the flow rate detection resistive element 13 and the resistor 16 constitute a first series circuit 19, and the temperature compensation resistive element 14 and the resistor 17 constitute a second series circuit 20. The first series circuit 19 and the second series circuit 20 are connected in parallel to constitute the bridge circuit 18.

As illustrated in FIG. 2, each of an output part 21 of the first series circuit 19 and an output part 22 of the second series circuit 20 is connected to a differential amplifier (amplifier) 23. A feedback circuit 24 including the differential amplifier 23 is connected to the bridge circuit 18. A transistor (not illustrated) and the like are included in the feedback circuit 24.

The resistors 16 and 17 have temperature coefficients of resistances (TCRs) smaller than those of the flow rate detection resistive element 13 and the temperature compensation resistive element 14. The flow rate detection resistive element 13 is controlled, for example, to have a predetermined resistance value Rs1 in a heated state in which a temperature is controlled to be higher than a predetermined ambient temperature by a predetermined value. In addition, the temperature compensation resistive element 14 is controlled, for example, to have a predetermined resistance value Rs2 at the above-described ambient temperature. Note that the resistance value Rs1 is smaller than the resistance value Rs2. The resistor 16 which constitutes the first series circuit 19 along with the flow rate detection resistive element 13 is, for example, a fixed resistor having a resistance value R1 which is similar to the resistance value Rs1 of the flow rate detection resistive element 13. In addition, the resistor 17 which constitutes the second series circuit 20 along with the temperature compensation resistive element 14 is, for example, a fixed resistor having a resistance value R2 which is similar to the resistance value Rs2 of the temperature compensation resistive element 14.

The flow rate detection resistive element 13 illustrated in FIG. 2 is arranged on of the case 7 side of the sensor illustrated in FIG. 1B, and the temperature compensation resistive element 14 is arranged on a side of the board 2 illustrated in FIG. 1B.

The wind passes through the through hole 7a illustrated in FIG. 1B, and reaches the flow rate detection resistive element 13 arranged on a detection surface. At this time, since the flow rate detection resistive element 13 serving as a heat generation resistor decreases in temperature, an electric potential of the output part 21 of the first series circuit 19 to which the flow rate detection resistive element 13 is connected varies. This provides a differential output via the differential amplifier 23. In the feedback circuit. 24, a driving voltage is applied to the flow rate detection resistive element 13 based on the differential output. A microcontroller described later can calculate a wind speed based on a voltage change necessary for heating the flow rate detection resistive element 13, and output the wind speed.

Note that the circuit configuration of the sensor 3 illustrated in FIG. 2 is merely one example, and the circuit configuration is not limited thereto.

Figure 3:
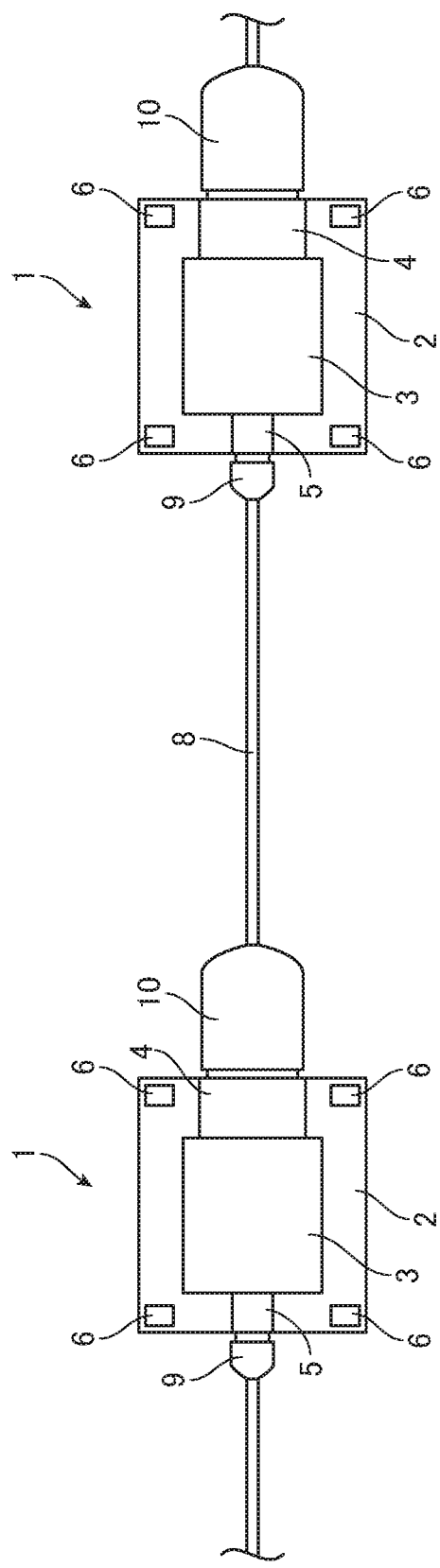
FIG. 3 is a plan view illustrating a state in which a plurality of sensor units of the present embodiment are connected.

As illustrated in FIG. 3, in the present embodiment, a plurality of sensor units 1 can be connected via communication cables 8 illustrated in FIG. 3, one end portion of the communication cable 8 is, for example, a micro USB plug 9, and the other end portion is, for example, a USE-A plug 10. The micro USE plug 9 is connected to the external connection terminal 5 on a side of a small opening provided in the sensor unit 1, and the USE-A plug 10 is connected to the external connection terminal 4 on a side of a large opening provided in the sensor unit 1.

Figure 4:
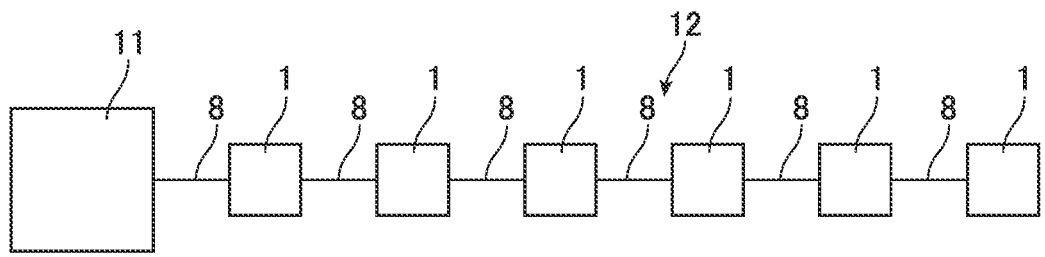
FIG. 4 is a schematic diagram illustrating an example of a multiple type sensor of the present embodiment.

As illustrated in FIG. 4, the plurality of sensor units 1 are arranged in a row via the communication cables 8, and a distal end of the communication cable 8 is connected to a host 11. The host 11 is a device for controlling communication, and refers to a master device in communication. The host 11 is a computer apparatus such as a notebook personal computer or a portable terminal provided with a control function of communication, and the type of the host 11 is not limited to a particular type.

In the present embodiment, a multiple-type sensor 12 can be formed by connecting the plurality of sensor units 1 in a daisy chain form.

Figure 5:
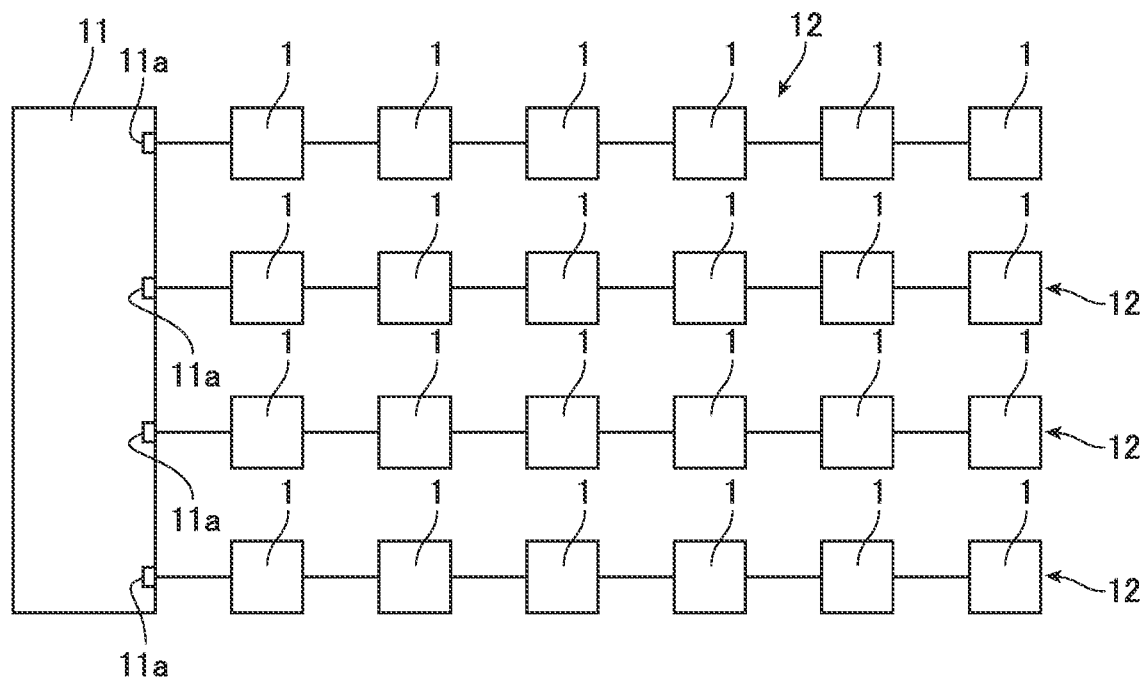
FIG. 5 is a schematic diagram illustrating an example of a multiple-type sensor of the present embodiment.

As illustrated in FIG. 5, the multiple-type sensor 12 illustrated in FIG. 4 can be connected to each of a plurality of channels 11a provided in the host 11. Providing the connection structure illustrated in FIG. 5 enables a number of sensor units 1 to be arranged in a matrix form.

In the present embodiment, the number of the sensor units 1 to be connected is not limited, but the multiple-type sensor 12 can be formed by connecting about several to several hundred sensor units 1. In the present embodiment, since the multiple-type sensor 12 can be formed only by connecting the sensor units 1 via the communication cables 8, the number of sensors in the multiple-type sensor 12 can be easily and freely increased, and therefore the multiple-type sensor 12 can be used to be applicable to various applications.

For example, the multiple-type sensor 12 can detect the wind speed over a wide range. An embodiment in which detection information on the wind speed of each of the sensor units 1 is transmitted from the corresponding reporting part 6 of the sensor unit 1 to the outside can be changed as appropriate. The reporting parts 6 are, for example, LEDs. Thus, it is possible to control to change light emission color from a proximal end to a distal end of the multiple-type sensor 12 according to the wind speed, for example. Therefore, the multiple-type sensor 12 can serve as illuminations or can be used for analysis of the fluid to be capable of visually appealing to a user.

In the present embodiment, as illustrated in FIG. 1A, the external connection terminals 4 and 5 have different shapes and sizes, thereby capable of preventing wrong connection. When, for example, the external connection terminal 5 is defined to be on a side communicating with the host 11 side at a higher-order position and the external connection terminal 4 is defined to be on a side communicating with the sensor unit 1 at a lower-order position, wrong connection such as reverse connection can be prevented.

Figure 6A:
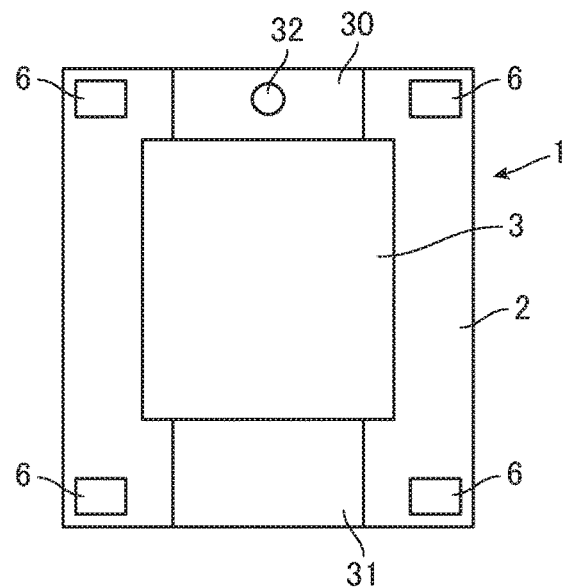
FIG. 6A is a plan view illustrating a sensor unit of another embodiment which is partly different from the sensor unit illustrated in FIG. 1A.

However, in the present embodiment, external connection terminals 30 and 31 provided in the sensor unit 1 may be the same connectors, as illustrated in FIG. 6A. In this case, for example, a mark 32 indicating a connection direction needs to be provided in at least the external connection terminal 30 to prevent the wrong connection. For example, a side on which the mark 32 is provided can be recognized as the host 11 side (higher-order side), thereby preventing the wrong connection.

Note that in the present embodiment, it is only required that the connection directions of the external connection terminals 30 and 31 can be identified, and a configuration other than the configuration in which the above-described external connection terminals 30 and 31 have different shapes and sizes or in which the mark 32 is provided may be also adopted to prevent the wrong connection.

Figure 6B:
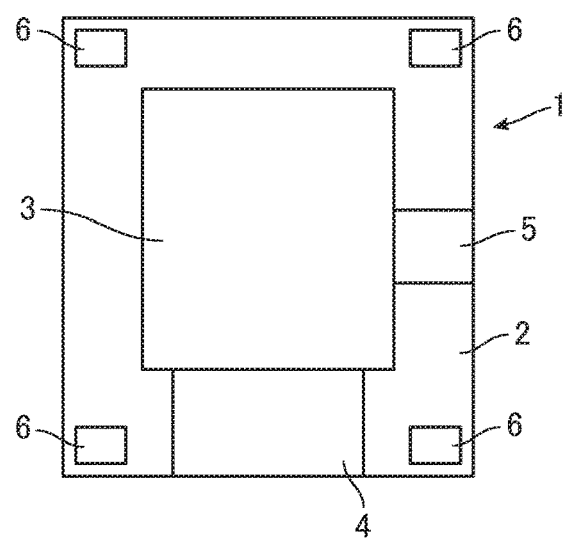
FIG. 6B is a plan view illustrating a sensor unit of another embodiment which is partly different from the sensor unit illustrated in FIG. 1A.

In addition, as illustrated in FIG. 1A, the sensor 3 and the external connection terminals 4 and 5 are arranged in a row, but for example, as illustrated in FIG. 6B, the external connection terminals 4 and 5 may be arranged at approximately 90° relative to one another with the sensor 3 being sandwiched in between. When the sensor unit 1 illustrated in FIG. 6B is used for at least a portion of the multiple-type sensor 12, the alignment direction of the sensor units 1 can be bent by it will be appreciated that the bending angle of the alignment direction of the sensor units 1 can be changed according to an angle formed between the external connection terminals 4 and 5 via the sensor 3.

Figure 6C:
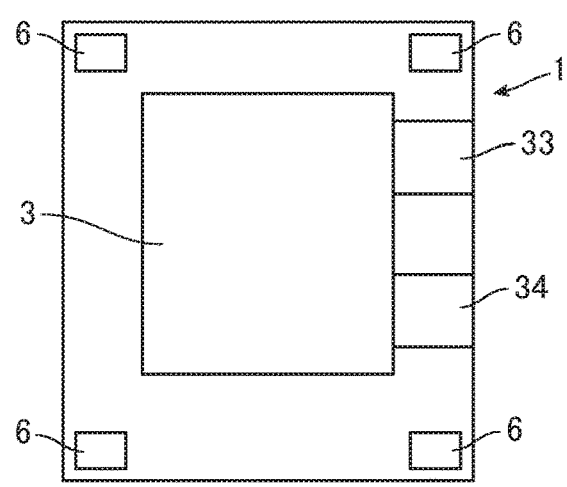
FIG. 6C is a plan view illustrating a sensor unit of another embodiment which is partly different from the sensor unit illustrated in FIG. 1A.

As illustrated in FIG. 6C, external connection terminals 33 and 34 may be arranged on the same side as viewed from the sensor 3. When the sensor unit 1 illustrated in FIG. 6C is used for at least a portion of the multiple-type sensor 12, the alignment direction of the sensor units 1 can be bent by 180°. Therefore, the sensor unit 1 in which the external connection terminals 4 and 5 area arranged in a row as illustrated in FIG. 1A and the sensor unit 1 in which the external connection terminals 33 and 34 are arranged on the same side as illustrated in FIG. 6C are used. This can provide a multiple-type sensor 12 in which the sensor units 1 are arranged in a meandering pattern even when the number of the channels 11a in the host 11 is one, for example.

Figure 7:
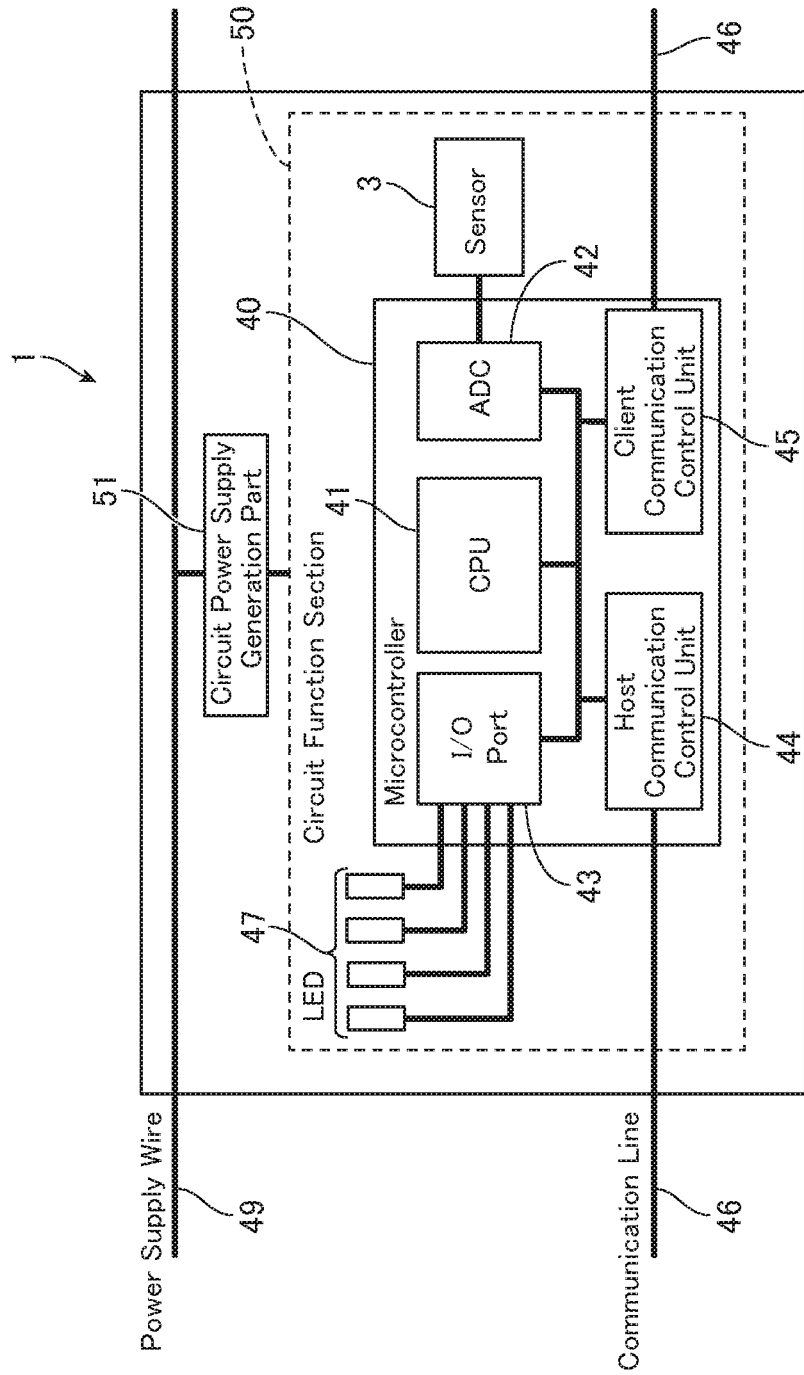
FIG. 7 is a block diagram illustrating the sensor unit of the present embodiment.

Next, a control structure of the sensor unit 1 of the present embodiment will be described. FIG. 7 is a block diagram illustrating the sensor unit 1 of the present embodiment.

As illustrated in FIG. 7, the sensor unit 1 includes the sensor 3, and a microcontroller 40 serving as a control unit that is electrically connected to the sensor 3 and is configured to process a detection signal of the sensor 3.

As illustrated in FIG. 7, the microcontroller 40 includes a CPU 41, an AD converter (ADC) 42, an input/output port (I/O port) 43, a host communication control unit 44, and a client communication control unit 45.

In this way, in the microcontroller 40, the CPU 41, the AD converter 42, the input/output port 43, the communication control units 44 and 45, and the like are configured on a single chip.

A detection signal from the sensor 3 is AD converted in the AD converter (ADC) 42, and is processed by the CPU 41. The CPU 41 performs processes such as controlling lighting of LEDs 47 serving as the reporting parts based on a sensor output, and writing data from the sensor output in a memory for transmitting to a host. In addition, the CPU 41 performs various processes such as a process based on a command from the host 11.

As illustrated in FIG. 7, in the present embodiment, the communication control unit is divided into the host communication control unit 44 and the client communication control unit 45. The host communication control unit 44 controls transmitting and receiving of the data to and from the sensor unit 1 on the host 11 side, which is a host device, or the host 11. Furthermore, the client communication control unit 45 controls transmitting and receiving of the data to and from the sensor unit 1 which is a client device. A line indicated with reference numeral 46 connected to the host communication control unit 44 and the client communication control unit 45 refers to a communication line 46 in the communication cable 8 (see FIG. 3). In terms of the relationship between the external connection terminals 4 and 5 illustrated in FIG. 1A, the external connection terminal 5 side corresponds to the host communication control unit 44 side, and the external connection terminal 4 side corresponds to the client communication control unit 45 side.

Figure 8:
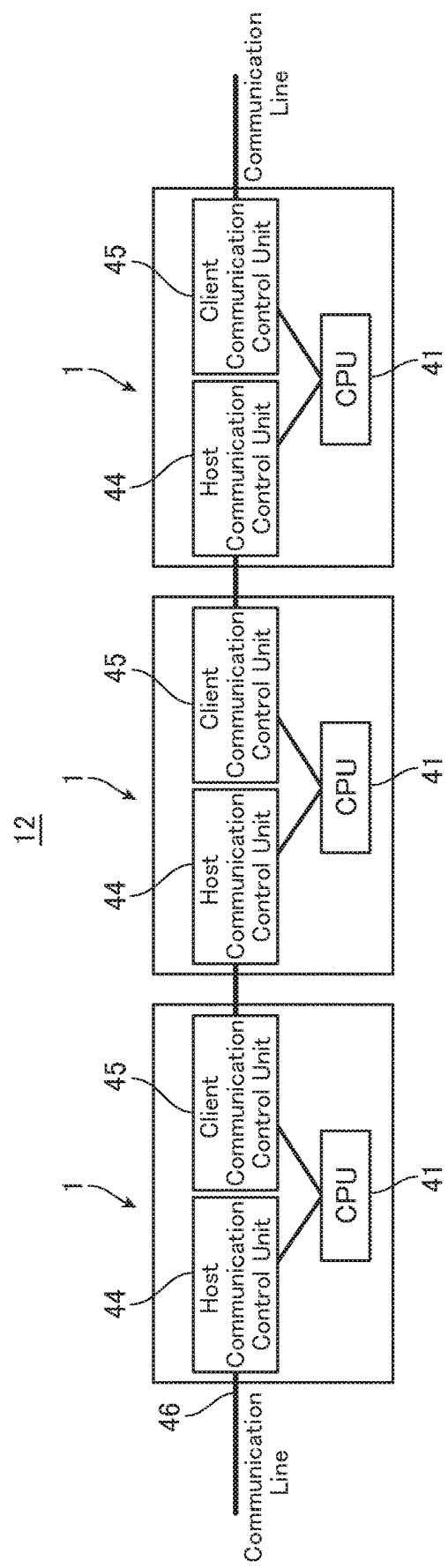
FIG. 8 is a block diagram illustrating a communication line side when a plurality of sensor units of the present embodiments are connected.

As in the present embodiment, the communication control unit is divided into the host communication control unit 44 and the client communication control unit 45. As illustrated in FIG. 8, this enables command transmission and transmission and reception of the data between the sensor units 1 adjacent to each other (or only between the host 11 and the sensor unit 1 adjacent to each other) even when the plurality of sensor units 1 are connected to form the multiple-type sensor 12. Note that FIG. 8 illustrates only a part of the control unit. Furthermore, the control unit can determine whether the communication is performed with the host 11 side locates on the host device or with the sensor unit 1 located on the client device. Therefore, when, for example, a command is to be transmitted from the sensor unit 1 in the middle illustrated in FIG. 8 to the sensor unit 1 on the left side in the figure which is on the host device side, the command can be properly transmitted to the sensor unit 1 side which is a host device, via the host communication control unit 44.

Thus, in the present embodiment, the communication can be established between the sensor units 1 adjacent to each other or between the host 11 and the sensor unit 1, thereby maintaining the communication quality at high quality.

In the multiple-type sensor 12 in which the plurality of sensor units 1 are connected, when, for example, a host, a flow sensor A, a flow sensor B, a flow sensor C, a flow sensor D, and flow sensor E are connected in this order, individual communication between the sensors or between the host and the flow sensor A can be performed. Even when, for example, the communication is performed between the host and the flow sensor A, the communication is also individually possible between the flow sensor A and the flow sensor B and between the flow sensor B and the flow sensor C. Accordingly, the degree of freedom in transmission and reception of the data can be improved.

Figure 9:
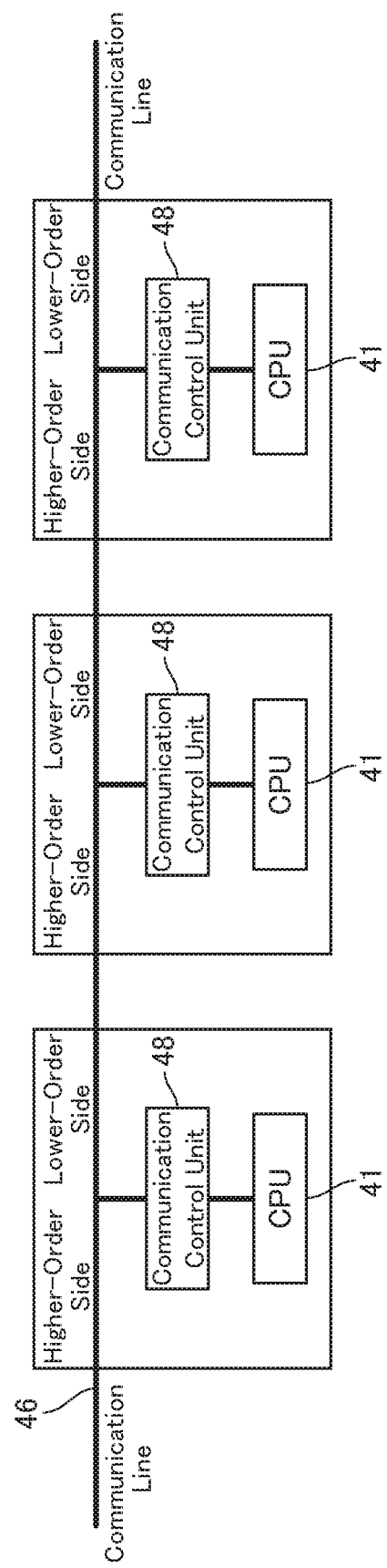
FIG. 9 is a block diagram illustrating a communication line side illustrating a configuration of comparative example.

On the other hand, FIG. 9 is a comparative example (conventional example). As illustrated in FIG. 9, in a configuration in which the sensor units 1 each have a single communication control unit 48 and are bus-connected to one another, the command from the host is transmitted to all of the sensor units 1 including unintended sensor units That is, even when, for example, the command from the host is to be transmitted to the middle sensor unit 1 illustrated in FIG. 9, the command is transmitted to all of the sensor units 1. Therefore, while this communication is performed, another command communication cannot be performed between the sensor units 1 or between the host and the sensor unit 1. In addition, when the number of sensor units 1 to be connected increases, the data signal is gradually attenuated toward the sensor unit 1 at a distal end (which is farther from the host), thereby easily causing deterioration in communication quality.

As illustrated in FIG. 7, the sensor unit 1 of the present embodiment includes a circuit power supply generation part 51 that generates a driving power supply of a circuit function section 50 including the sensor 3, the microcontroller 40, and the LEDs 47 (reporting parts). The circuit power supply generation part 51 is connected to the power supply wire 49 in the communication cable 8 (see FIG. 3).

A step-down circuit is incorporated in the circuit power supply generation part 51, and generates the driving power supply of the circuit function section 50. For example, the host side converts 100 V AC to 24 V DC using AC/DC converter, and supplies the converted voltage to the sensor unit 1. Then, in the sensor unit 1, the voltage is decreased to a predetermined voltage by the circuit power supply generation part 51 having the step-down circuit, to thereby drive the circuit. At this time, the circuit power supply generation part 51 decreases the voltage to, for example, 5 V or 3 V according to the mounted IC.

On the other hand, in a configuration having no circuit power supply generation part 51 of the present embodiment, the host side decreases a voltage to a predetermined voltage, for example, 5 V which is a driving voltage of the sensor unit 1, and supplies the voltage to the sensor unit 1. In such a configuration, when a number of sensor units 1 are connected in sequence, the voltage drop may become larger as farther from the host, and when the number of sensor units 1 to be connected is excessively increased and the communication cable is too long, the sensor unit 1 on the distal end side may not be able to be properly driven.

Figure 10:
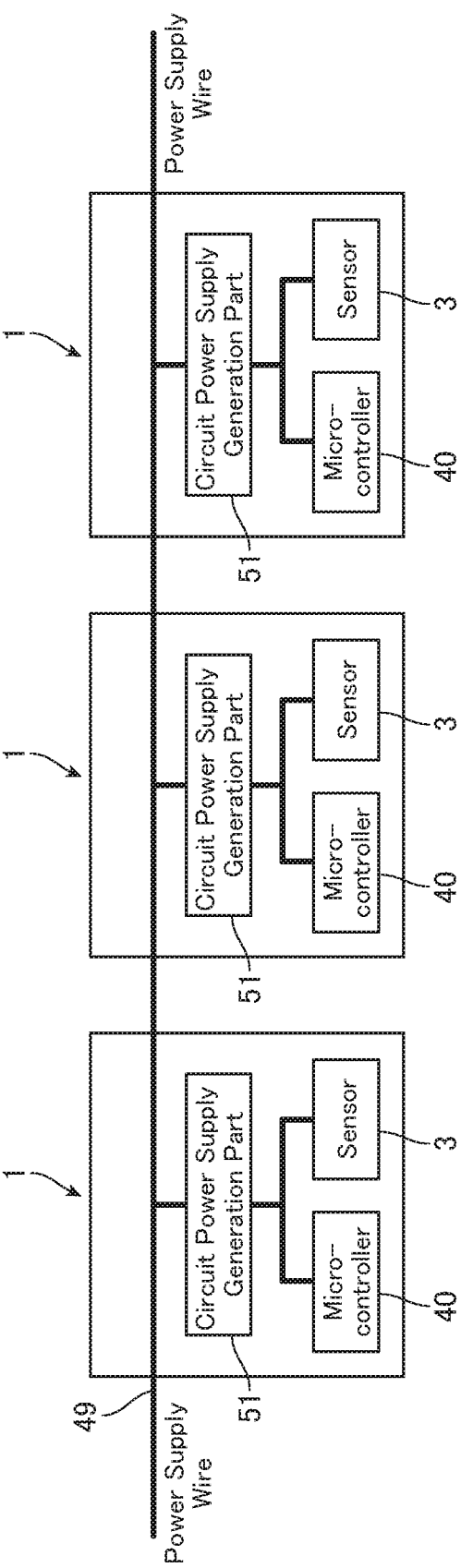
FIG. 10 is a block diagram illustrating a power supply wire side when the plurality of sensor units of the present embodiment are connected.

In contrast, as illustrated in FIG. 10, when the circuit power supply generation parts 51 are provided in the respective sensor units 1, the circuit power supply generation parts 51 can individually generate the driving power supplies of the circuit function sections 50 in the respective sensor units 1 by supplying a sufficient high voltage from the host. In the present embodiment, all of the power supplies of the microcontroller 40 and the sensor 3 included in the circuit function section 50 can be supplied from the circuit power supply generation part 51. Thus, in the multiple-type sensor 12, the voltage drop can be suppressed, and each of the sensor units 1 can be properly driven. Note that FIG. 10 illustrates only a part of the control unit.

A characteristic configuration of the present embodiment will be described. The sensor unit 1 of the present embodiment includes the sensor 3, and a microcontroller 40 (control unit) that is electrically connected with the sensor 3 and processes a detection signal of the sensor 3, as illustrated in FIG. 7. The microcontroller 40 includes the host communication control unit 44 that communicates with a host device and the client communication control unit 45 that communicates with a client device. Thus, the deterioration in communication quality can be suppressed as compared with in the conventional art even when the plurality of sensor units 1 are connected in sequence. That is, in the present embodiment, the communication can be established between the sensor units 1 adjacent to each other or between the host 11 and the sensor unit 1, thereby properly maintaining the communication quality.

In the present embodiment, it is preferable that the sensor unit 1 further includes the circuit power supply generation part 51 that generates a driving power supply of the circuit function section 50 including the sensor 3 and the microcontroller 40, as illustrated in FIG. 7. Thus, the circuit power supply generation parts 51 can individually generate the driving power supplies of the circuit function sections 50 in the respective sensor units 1 by supplying a sufficient high voltage from the host 11. In the present embodiment, all of the power supplies of the microcontroller 40 and the sensor 3 included in the circuit function section 50 can be supplied from the circuit power supply generation part 51. Thus, in the multiple-type sensor 12, the voltage drop can be suppressed, and each of the sensor units 1 can be properly driven.

In the present embodiment, it is preferable that the sensor unit 1 further includes the reporting part 6 that reports detection information of the sensor 3. In the present embodiment, the LED is exemplified as the reporting part 6, but the reporting part 6 is not limited to LED and may be another light-emitting device. Alternatively, the reporting part 6 may report physical quantity changes by operation such as sound or vibration other than light emission.

When the reporting part 6 is a light-emitting device, the intensity and color of light can be changed according to the wind speed, for example. Alternatively, when the reporting part 6 is a sound device, the volume and tone of sound can be changed according to the wind speed, for example. When the reporting part 6 is a vibration device, the magnitude of vibration and the rhythm of vibration can be changed according to the wind speed, for example.

Although the above description exemplifies the sensor unit 1 as a sensor unit 1, the sensor unit 1 is not limited to the exemplified sensor unit 1. The sensor unit 1 includes all of components that can detect an external change and convert it into an electric signal. It is preferable that the sensor unit 1 can detect physical quantity changes such as temperature changes, humidity changes, and pressure changes.

In the above description, the USB terminals are exemplified as the external connection terminals 4 and 5. However, the external connection terminals 4 and 5 are not limited to USB terminals, and each may be any terminal capable of communicating between the sensor units 1.

In the present embodiment, the multiple-type sensor 12 can be configured in which the plurality of sensor units 1 are connected via the communication cables 8 between the external connection terminals 4 and 5, as illustrated in FIG. 3, FIG. 4 and FIG. 5. As described above, in the present embodiment, the communication can be performed not only using bus connection communication in FIG. 9 but also using connection communication illustrated in FIG. 8 in which the communication control unit is divided into the host control unit and the client control unit, thereby maintaining the communication quality at high quality. Furthermore, in the present embodiment, the driving power supply can be generated using the circuit power supply generation part 51 illustrated in FIG. 10 to suppress the voltage drop, so that all of the sensor units 1 from a proximal end to a distal end can be properly driven.

Furthermore, in the present embodiment, the multiple-type sensor 12 can be used to be applicable to various applications. For example, the multiple-type sensor 12 can be used as indoor or outdoor illumination, and for analysis of the wind speed. When the multiple-type sensor 12 of the present embodiment is attached to, for example, a building or a movable body, a wide range of fluid state can be easily analyzed.

As illustrated in FIG. 5, a plurality of multiple-type sensors 12 can be arranged in a matrix form. Thus, the user can grasp a state in which the wind gradually weakens as farther from a position where the wind strongly hits and a wind direction based on the light-emitting changes of the matrix.

INDUSTRIAL APPLICABILITY

In the present invention, the communication control unit of the sensor unit is divided into the host communication control unit and the client communication control unit, so that the communication quality can be maintained in a good level. By providing the circuit power supply generation part in the sensor unit, the voltage drop can be suppressed even when a number of sensor units are connected in sequence, and each of the sensor units can be properly driven. As a result, the data communication can be properly performed by determining whether the communication is performed between the sensor units, between the sensor unit and the host, or in a direction to the host device or the client device. In this way, the host can properly process the detection information of each of the sensor units or can transmit the command. Accordingly, for example, the light-emitting state of the multiple-type sensor can be changed, the range of the detection accuracy can be changed, and the degree of freedom of control can be improved, depending on applications of the multiple-type sensor. As described above, the multiple-type sensor of the present invention can be used to be applicable to various applications.

The present application is based on Japanese Patent Application No. 2017-173739 filed on Sep. 11, 2017. The entire content of this application is incorporated herein.

The invention claimed is:

1. A sensor device, comprising:
   a sensor;
   a first external connection terminal;
   a second external connection terminal; and
   a controller that is electrically connected with the sensor and processes a detection signal of the sensor,
   wherein the controller comprises a CPU, a host communication controller, and a client communication controller,
   wherein the host communication controller and the client communication controller are provided independently from each other,
   wherein the host communication controller performs communication with a host device via the first external connection terminal, and
   wherein the client communication controller performs communication with a client device via the second external connection terminal.

2. The sensor device according to claim 1, further comprising:
   a circuit power supply generation part that generates a driving power supply of a circuit function section including the sensor and the controller.

3. The sensor device according to claim 1, further comprising:
   a reporting part that reports detection information of the sensor.

4. A multiple-type sensor comprising:
   a plurality of sensor devices that are connected via communication cables, each sensor device including
   a sensor;
   a first external connection terminal;
   a second external connection terminal; and
   a controller that is electrically connected with the sensor and processes a detection signal of the sensor,
   wherein the controller includes a CPU, a host communication controller, and a client communication controller,
   wherein the host communication control controller and the client communication controller are provided independently from each other,
   wherein the host communication controller performs communication with a host device via the first external connection terminal, and
   wherein the client communication controller performs communication with a client device via the second external connection terminal.

* * * * *